(12) United States Patent
dela Cruz

(10) Patent No.: US 11,043,841 B2
(45) Date of Patent: Jun. 22, 2021

(54) COIL ARRANGEMENT

(71) Applicant: Apple Inc., Cupertino, CA (US)

(72) Inventor: Lawrence Bernardo dela Cruz, Freemans Bay (NZ)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 16/189,948

(22) Filed: Nov. 13, 2018

(65) Prior Publication Data

US 2019/0081511 A1 Mar. 14, 2019

Related U.S. Application Data

(63) Continuation of application No. PCT/NZ2017/050068, filed on May 22, 2017.

(60) Provisional application No. 62/341,385, filed on May 25, 2016.

(51) Int. Cl.
*H02J 50/10* (2016.01)
*H01F 38/14* (2006.01)
*H01F 21/06* (2006.01)
*H02J 50/12* (2016.01)
*H02J 50/70* (2016.01)
*H01F 29/10* (2006.01)

(52) U.S. Cl.
CPC ............... *H02J 50/10* (2016.02); *H01F 21/06* (2013.01); *H01F 38/14* (2013.01); *H02J 50/12* (2016.02); *H02J 50/70* (2016.02); *H01F 29/10* (2013.01)

(58) Field of Classification Search
CPC .......... H01F 38/14; H01F 21/06; H01F 29/10; H02J 50/12; H02J 50/70; H02J 50/10
See application file for complete search history.

(56) References Cited

U.S. PATENT DOCUMENTS

| 4,183,193 A | 1/1980 | Klingelhofer et al. |
| 4,873,677 A | 10/1989 | Sakamoto et al. |
| 4,973,907 A | 11/1990 | Bergman et al. |
| 4,980,794 A * | 12/1990 | Engel .................. G01R 15/183 318/474 |
| 5,000,178 A | 3/1991 | Griffith |
| 5,469,036 A | 11/1995 | Eto |

(Continued)

FOREIGN PATENT DOCUMENTS

| CN | 101461114 | 6/2009 |
| DE | 1915044 A1 | 10/1970 |

(Continued)

OTHER PUBLICATIONS

"Abdolkhani A. et al., "A Novel Detached Magnetic Coupling Structure for Contactless Power Transfer", IECON/ICELIE, 1103-1108 (2011)".

(Continued)

*Primary Examiner* — Jared Fureman
*Assistant Examiner* — Esayas G Yeshaw
(74) *Attorney, Agent, or Firm* — Blank Rome LLP

(57) ABSTRACT

A coil arrangement for an inductive power transfer system comprising a core (32, 33) having a region of decreased permeability (34), a coil (45) associated with the core, and a tuning slug (35) which is moveable along an axis adjacent the region of decreased permeability in order to adjust the inductance of the coil arrangement, the tuning slug (35) having an effective permeability which varies along said axis.

21 Claims, 8 Drawing Sheets

(56) References Cited

U.S. PATENT DOCUMENTS

| | | |
|---|---|---|
| 5,496,036 A | 3/1996 | Chester |
| 5,506,560 A | 4/1996 | Takeuchi et al. |
| 5,654,621 A | 8/1997 | Seelig |
| 5,945,744 A | 8/1999 | Dobler et al. |
| 5,959,433 A | 9/1999 | Rohde |
| 6,151,231 A | 11/2000 | Saint-Pierre et al. |
| 6,320,772 B1 | 11/2001 | Doyama et al. |
| 6,510,109 B2 | 1/2003 | Ohmori |
| 6,803,744 B1 | 10/2004 | Sabo |
| 7,057,486 B2 | 6/2006 | Kiko |
| 7,103,413 B2 | 9/2006 | Swanson et al. |
| 7,164,255 B2 | 1/2007 | Hui |
| 7,197,113 B1 | 3/2007 | Katcha et al. |
| 7,394,243 B2 | 7/2008 | Tsuchida et al. |
| 7,525,283 B2 | 8/2009 | Cheng et al. |
| 7,599,744 B2 | 10/2009 | Giordano et al. |
| 7,880,337 B2 | 2/2011 | Farkas |
| 7,915,858 B2 | 3/2011 | Liu et al. |
| 7,948,208 B2 | 5/2011 | Partovi et al. |
| 8,125,305 B2 | 2/2012 | Saito et al. |
| 8,169,185 B2 | 5/2012 | Partovi et al. |
| 8,228,010 B2 | 7/2012 | Zadeh |
| 8,258,653 B2 | 9/2012 | Kitamura et al. |
| 8,299,753 B2 | 10/2012 | Hui |
| 8,519,668 B2 | 8/2013 | Hui |
| 8,629,652 B2 | 1/2014 | Partovi et al. |
| 8,629,654 B2 | 1/2014 | Partovi et al. |
| 8,824,624 B2 | 9/2014 | Loef et al. |
| 9,064,632 B2 | 6/2015 | Loiselle et al. |
| 9,362,985 B2 * | 6/2016 | Uchida ............... H01F 27/365 |
| 2004/0000466 A1 | 1/2004 | Kubat et al. |
| 2004/0046634 A1 | 3/2004 | Gokhale et al. |
| 2005/0068019 A1 | 3/2005 | Nakamura et al. |
| 2005/0133497 A1 | 6/2005 | Makoto |
| 2005/0140482 A1 | 6/2005 | Cheng et al. |
| 2007/0064406 A1 | 3/2007 | Bead |
| 2010/0109604 A1 | 5/2010 | Boys et al. |
| 2010/0259217 A1 | 10/2010 | Baarman et al. |
| 2010/0270288 A1 | 10/2010 | Hackbarth et al. |
| 2011/0115429 A1 | 5/2011 | Toivola et al. |
| 2012/0177041 A1 | 7/2012 | Kook |
| 2013/0001571 A1 | 1/2013 | Jung et al. |
| 2013/0026850 A1 | 1/2013 | Throngnumchai et al. |
| 2013/0030892 A1 | 1/2013 | Liu et al. |
| 2013/0119773 A1 | 5/2013 | Davis |
| 2013/0175984 A1 | 7/2013 | Yamazaki et al. |
| 2014/0091755 A1 | 4/2014 | Walley et al. |
| 2014/0197687 A1 | 7/2014 | Lin |
| 2015/0138031 A1 | 5/2015 | Van Gils et al. |
| 2015/0302982 A1 * | 10/2015 | Meyer .............. H01F 21/06 336/105 |
| 2016/0099602 A1 | 8/2016 | Leabman et al. |
| 2017/0140868 A1 * | 5/2017 | Kim .............. H01F 27/24 |

FOREIGN PATENT DOCUMENTS

| | | |
|---|---|---|
| DE | 3213602 A1 | 10/1983 |
| DE | 3733944 A1 | 4/1989 |
| DE | 3839386 A1 | 5/1990 |
| DE | 10044558 A1 | 3/2002 |
| DE | 10341113 B4 | 4/2009 |
| EP | 0370377 A2 | 5/1990 |
| EP | 0399563 A2 | 11/1990 |
| EP | 0399563 A3 | 7/1991 |
| EP | 0370377 A3 | 2/1992 |
| EP | 0965521 A1 | 12/1999 |
| EP | 1372173 A1 | 12/2003 |
| EP | 1372173 B1 | 5/2008 |
| EP | 2602908 A1 | 6/2013 |
| EP | 3127215 A1 | 2/2017 |
| FR | 238945 A1 | 9/1978 |
| GB | 2103886 B | 12/1984 |
| JP | 57096513 A | 6/1982 |
| JP | 59058811 A | 4/1984 |
| JP | 60254400 A | 12/1985 |
| JP | S60254440 A | 12/1985 |
| JP | H0354103 A | 3/1991 |
| JP | H06197479 A | 7/1994 |
| JP | H06277358 | 10/1994 |
| JP | 09007837 A | 1/1997 |
| JP | 2846090 B2 | 1/1999 |
| JP | 2001044054 | 2/2001 |
| JP | 2001196249 A | 7/2001 |
| JP | 2002246248 | 8/2002 |
| JP | 2003118671 A | 4/2003 |
| JP | 2003141466 A | 5/2003 |
| JP | 2004235462 A | 8/2004 |
| JP | 2004281814 A | 10/2004 |
| JP | 2005302959 A | 10/2005 |
| JP | 06-029128 A | 2/2006 |
| JP | 2006042519 | 2/2006 |
| JP | 06-105471 A | 4/2006 |
| JP | 2006128381 | 5/2006 |
| JP | 2006245363 A | 9/2006 |
| JP | 2006245950 A | 9/2006 |
| JP | 2007505480 | 3/2007 |
| JP | 2008154446 A | 7/2008 |
| JP | 2008263740 A | 10/2008 |
| JP | 2010527226 | 11/2008 |
| JP | 2009088479 A | 4/2009 |
| JP | 2009164293 A | 7/2009 |
| JP | 2009201328 | 9/2009 |
| JP | 2009295930 A | 12/2009 |
| JP | 2010119187 A | 5/2010 |
| JP | 2010135701 A | 6/2010 |
| JP | 2011072188 A | 4/2011 |
| JP | 2011103694 A | 5/2011 |
| JP | 1747789 B2 | 8/2011 |
| JP | 2011181769 A | 9/2011 |
| JP | 2011229360 A | 11/2011 |
| JP | 04835787 B1 | 12/2011 |
| JP | 2012079806 A | 4/2012 |
| JP | 2012119496 A | 6/2012 |
| JP | 2012120328 A | 6/2012 |
| JP | 2012178529 A | 9/2012 |
| JP | 2013534040 A | 8/2013 |
| JP | 2014023348 | 2/2014 |
| KR | 100944113 | 2/2010 |
| KR | 1020100017582 | 2/2010 |
| WO | 2003105308 | 12/2003 |
| WO | 2005024865 | 3/2005 |
| WO | 2005033819 A2 | 4/2005 |
| WO | 2005109598 A1 | 11/2005 |
| WO | 2006059771 A1 | 6/2006 |
| WO | 2007031897 A1 | 3/2007 |
| WO | 200712632 | 11/2007 |
| WO | 2007126321 | 11/2007 |
| WO | 2007131373 A1 | 11/2007 |
| WO | 2008137996 A1 | 11/2008 |
| WO | 2008140333 | 11/2008 |
| WO | 2009015745 A1 | 2/2009 |
| WO | 2009004587 A2 | 4/2009 |
| WO | 2010090539 A1 | 8/2010 |
| WO | 20100909538 A1 | 8/2010 |
| WO | 2010124165 A1 | 10/2010 |
| WO | 2011016736 | 2/2011 |
| WO | 2011016737 A1 | 2/2011 |
| WO | 2011074091 A1 | 6/2011 |
| WO | 2012040548 A1 | 3/2012 |
| WO | 2012073427 A1 | 6/2012 |
| WO | 2013036146 A1 | 3/2013 |
| WO | 2013103943 A1 | 7/2013 |
| WO | 2013122483 A1 | 8/2013 |
| WO | 2013186180 A1 | 12/2013 |
| WO | 2013187777 A2 | 12/2013 |
| WO | 2014011059 A1 | 1/2014 |
| WO | 2014083015 A1 | 6/2014 |

(56) References Cited

FOREIGN PATENT DOCUMENTS

WO 2014122121 A1 8/2014
WO 2014122125 A1 8/2014

OTHER PUBLICATIONS

"Abdolkhani, A. et al., "A Sandwiched Magnetic Coupling Structure for Contactless Slipring Applications", International Geoinformatics Research and Development, 2(3): 1-9 (2011)".

"Abdolkhani, A. et al., "Face to Face Through-hole Contactless Slipring System for Rotary Applications", IJAREEIE, 2(9): 4277-4286 (2013)".

"Abdolkhani, A. et al., "Modelling and Parameters Identification of Through-Hole Type Wind Turbine Contactless Sliprings", SCIRP/Engineering, 4: 272-283 (2012)".

"Esser, A. et al., "A New Approach to Power Supplies for Robots", IEEE Transactions on Industry Applications, 27(5): 872-875 (1991)".

"Kacprzak, D. "A Novel S-Pickup for High Power Inductive Power Transfer Systems", Magnetics Conference, INTERMAG, 1 pg. (2006)".

"Kacprzak, D. et al., "An Improved Magnetic Design for Inductively Coupled Power Transfer System Pickups", Power Engineering Conference, IPEC, 1133-1136 (2005)".

"Legranger, J. et al., "Comparison of Two Optimal Rotary Transformer Designs for Highly Constrained Applications", Electric Machines & Drives Conference, IEMDC, 1546-1551 (2007)".

"Moradewicz, A.J. et al., "High efficiency contactless energy transfer system with power electronic resonant converter", Technical Sciences, 57(4): 375-381 (2009)".

"Muljadi, E. et al., "Pitch-Controlled Variable-Speed Wind Turbine Generation", Industry Applications Conference, 34th IAS Annual Meeting, Conference Record of the 1999 IEEE, 1: 323-330 (1999)".

"Papastergiou, K. et al., "An Airborne Radar Power Supply With Contactless Transfer of Energy—Part I: Rotating Transformer", IEEE Transactions on Industrial Electronics, 54(5): 2874-2884 (2007)".

"Papastergiou, K. et al., "Contact-less Transfer of Energy by means of a Rotating Transformer", IEEE ISIE, 1735-1740 (2005)".

"Potter, B.A. et al., "Design, Implementation and Characterisation of a Contactless Power Transfer System for Rotating Applications", IEEE, 2168-2173 (2006)".

"Spackman, D. et al., "Magnetic Interference in Multi-Pickup Monorail Inductively Coupled Power Transfer Systems", Journal of the Japan Society of Applied Electromagnetics and Mechanics, 15(3): 238-241 (2007)".

"Zaheer, A. et al., "A Bipolar Pad in a 10 kHz, 300W Distributed IPT System for AGV applications", IEEE Transactions on Industrial Electronics, pp. 1-14 (2013)".

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

Bosshard et al., "Comprehensive Evaluation of Rectangular and Double-D Coil Geometry for 50 kw185 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

Boys, John T., et al., "Controlling Inrush Currents in Inductively Coupled Power Systems", 2005 International Power Engineering Conference, Nov. 29, 2005-Dec. 2, 2005, 7, IEEE, Singapore, Singapore.

Gao. "Demodulating Communication Signals of Qi-Compliant Low-Power Wireless Charger Using MC56F8006 DSC." Freescale Semiconductor Inc. (2013) pp. 1-21.

Waffenschmidt et al. "Limitation of Inductive Power Transfer for Consumer Applications." 13th European Conference on Power Electronics (EPE), (Sep. 8, 2009), pp. 1-10.

* cited by examiner

COIL ARRANGEMENT

FIELD OF THE INVENTION

The present invention is in the field of wireless power transfer systems. More particularly, but not exclusively, the invention relates to magnetically permeable cores incorporated into transmitter coils, receiver coils and inductors in resonant and non-resonant circuits of wireless power transfer systems.

BACKGROUND OF THE INVENTION

In the production of winding cores for inductors, manufacturing variations causing small variations in inductance can significantly affect performance, especially for resonant circuits. One particular kind of ferromagnetic core used in the production of inductors is known as a "gapped core". The ferromagnetic core may be shaped into a circle or rectangle or other suitable shape with a section removed to form an air gap. These are typically used to address saturation and other performance issues. It is difficult to trim gapped cores as the introduction of small amounts of magnetically permeable material into the air gap can result in a significant change in inductance.

One solution is to introduce a moveable magnetic slug however this can result in significant non-linear changes in inductance of a wound gapped core. To obtain better precision, a fine screw thread is cut on the face of the slug and the faces on either side of the air gap are correspondingly tapped. However, the precision machining required to achieve precise trimming can be expensive.

It is an object of the invention to provide an improved coil arrangement or to at least provide the public with a useful choice.

SUMMARY OF THE INVENTION

According to one exemplary embodiment there is provided a coil arrangement for an inductive power transfer system comprising:
  a. a core having a region of decreased permeability,
  b. a coil associated with the core, and
  c. a tuning slug which is moveable along an axis adjacent the region of decreased permeability in order to adjust the inductance of the coil arrangement, the tuning slug having an effective permeability which varies along said axis.

According to another exemplary embodiment there is provided a coil arrangement for an inductive power transfer system comprising:
  a. a core having a region of decreased permeability and a bore passing through the region of decreased permeability;
  b. a coil associated with the core, and
  c. a tuning slug which tapers at one end and is movable along the bore into the region of decreased permeability to adjust the inductance of the coil arrangement.

According to another exemplary embodiment there is provided a coil arrangement for an inductive power transfer system comprising:
  a. a core having a region of decreased permeability and a bore passing through the region of decreased permeability;
  b. a coil associated with the core, and
  c. a tuning slug having progressively increasing effective permeability from one end thereof and being movable along the bore into the region of decreased permeability to adjust the inductance of the coil arrangement.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of exemplary embodiments given below, serve to explain the principles of the invention.

FIG. 2 shows a plan view of the core and tuning slug shown in FIG. 1a;

DETAILED DESCRIPTION OF EMBODIMENTS OF THE INVENTION

Figure 1A:
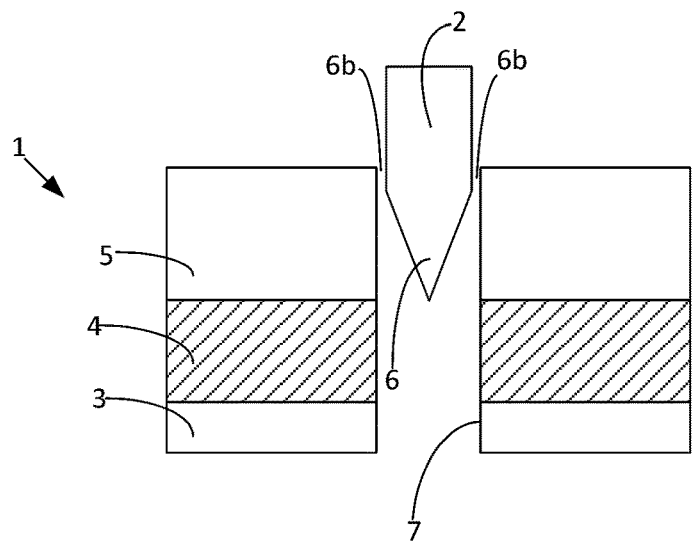
FIG. 1a shows a cross sectional view of a tuning slug having a conical end engaged in a bore of a core in a first position.
Figure 1B:
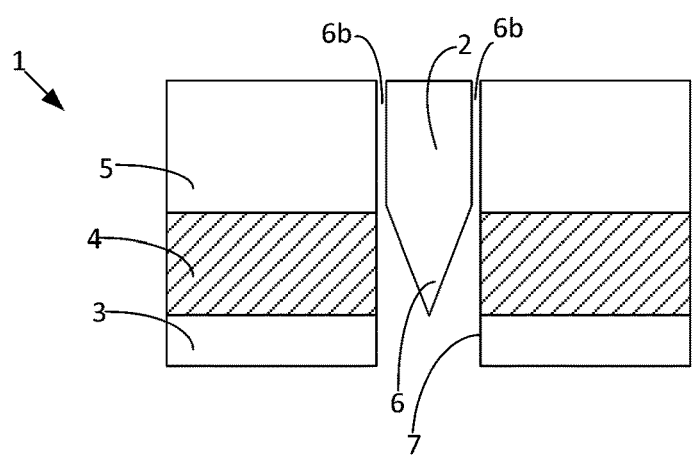
FIG. 1b shows a cross sectional view of a tuning slug having a conical end engaged in a bore of a core in a second position.
Figure 1C:
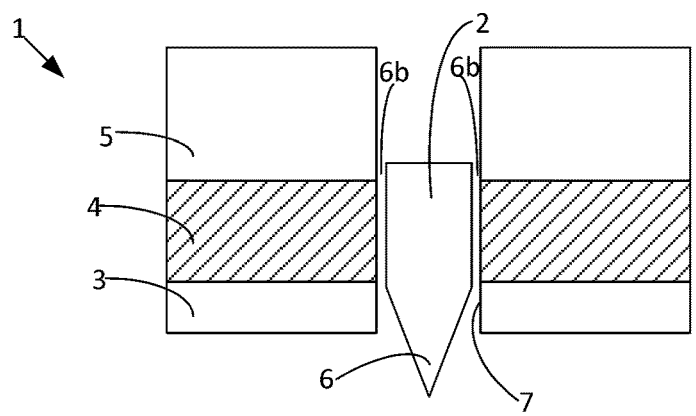
FIG. 1c shows a cross sectional view of a tuning slug having a conical end engaged in a bore of a core in a third position.
Figure 2:
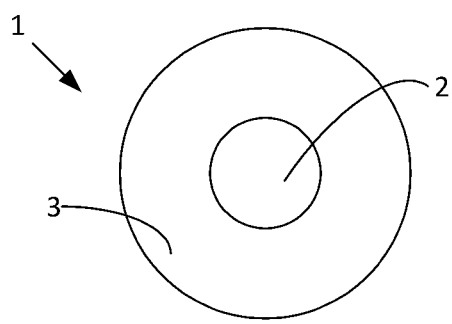

Referring to FIGS. 1 and 2 a first core topology will be described. The core 1 is of annular form having a slug 2 located within its central bore 7. Core 1 consists of a first layer 3 of high permeability material, a second layer 4 of lower permeability material and a third layer 5 of high permeability material. References in this specification to "permeability" are to magnetic permeability. Layers 3 and 5 may be formed of a material such as ferrite. The second layer 4 may have lower permeability than layers 3 and 5 due to the entire volume of the layer 4 being formed of lower permeability material or due to part of the layer 4 being a low permeability material, such as air, and the remainder being a high permeability material such as layers 3 and 5 (e.g. a gapped core). This same core 1 construction will be referred to in FIGS. 1 to 9. In all the following example the cores are circular in plan although it will be appreciated that other shapes may be employed.

The tuning slug 2 may be moved between two extreme positions shown in FIGS. 1a and 1c, which allows for adjusting the inductance of a coil wound on the core 1 (ie trimming). A gap 6b is maintained between the sides of the tuning slug 2 and the core layers 3 and 5 so that even when the tuning slug is fully extended as in FIG. 1c, an area of low permeability is retained in order to avoid saturation of the core at high coil currents. The gap 6b may be formed of low permeability material such as a plastic sleeve or air. FIG. 1b shows the tuning slug in an intermediate tuning position. As with the size of the core air gap 4, the size of the side gaps 6b can be designed depending on the requirements of the coil arrangement as would be appreciated by those skilled in the art. For simplicity of explanation and drawing, subsequent FIGS. 3-17 illustrating alternative tuning slug configurations do not show these side gaps between the tuning slug and core.

The tuning slug 2 in FIG. 1 may be formed of a high permeability material such as ferrite. Slug 2 tapers towards its distal end 6 to form a conical end in cross-section along the axis of the tuning slug. Tuning slug 2 is moveable (i.e. may be raised and lowered) along an axis adjacent the region of decreased permeability 4 to tune an inductor. It will be appreciated that the volume of high permeability material of the slug introduced to bridge the flux between layers 3 and 5 only gradually increases due to the tapered form of the distal end 6. This allows for fine tuning of an inductor with relatively coarse control of movement of slug 2 with respect to core 1. Where slug 2 is threaded and engages with a thread formed in bore 7 of core 1 this allows a relatively coarse thread to be employed. Tuning slug 2 may alternatively slide within bore 7 and be fixed in place when tuned, for example by gluing.

Figure 3:
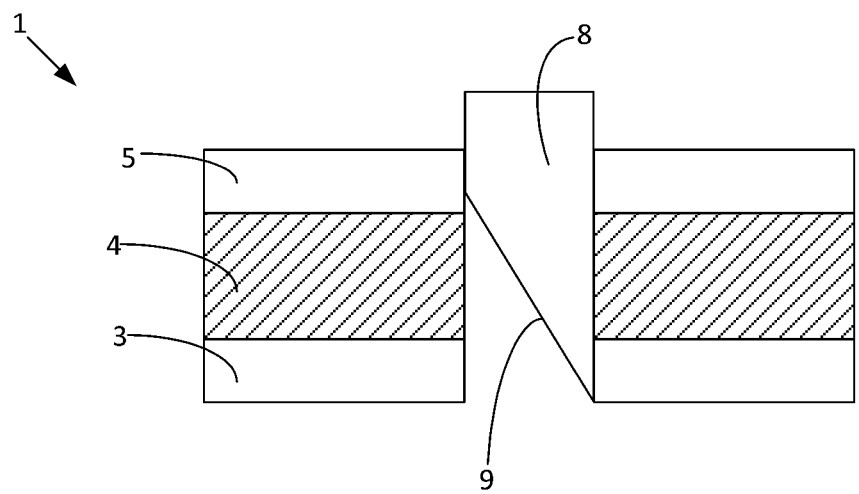
FIG. 3 shows a cross sectional view of a tuning slug having a wedge shaped end engaged in a bore of a core.

Referring now to FIG. 3 an alternative embodiment utilizes a tuning slug of a different shape with the core 1 shown in FIGS. 1 and 2. In this case the slug has a wedged distal end 9. This design may be simpler to form but still only progressively introduced the volume of high permeability material to bridge the flux between layers 3 and 5.

Figure 4:
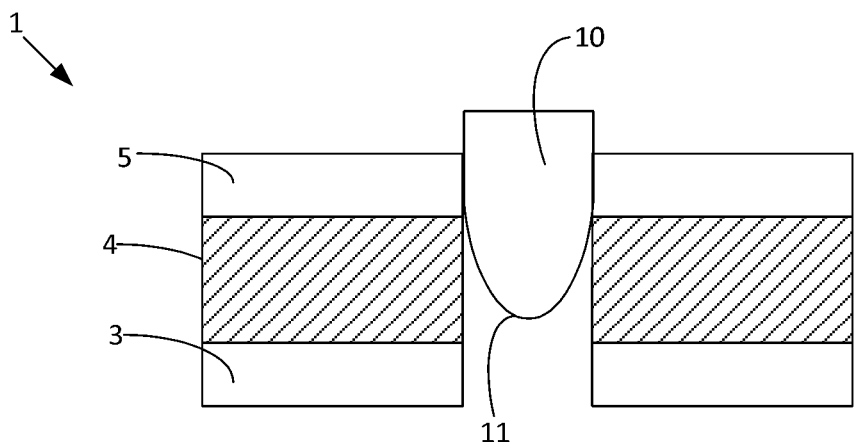
FIG. 4 shows a cross sectional view of a tuning slug having an elliptical end engaged in a bore of a core.

Referring now to FIG. 4 an alternative embodiment utilizes a tuning slug of a different shape with the core 1 shown in FIGS. 1 and 2. In this case the slug has a distal end 11 that is elliptical in cross-section along the axis of the tuning slug. This design may avoid undesirable heating caused be a sharply pointed end in some applications.

Figure 5:
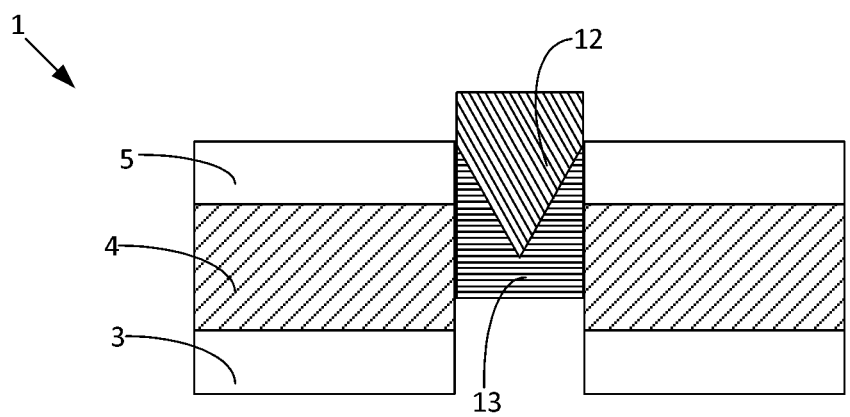
FIG. 5 shows a cross sectional view of a tuning slug of composite construction engaged in a bore of a core.

Referring now to FIG. 5 an alternative embodiment utilizes a tuning slug of a different shape with the core 1 shown in FIGS. 1 and 2. In this case the slug is formed of a high permeability section 12 and a low permeability section 13. Whilst shown in this drawing as two distinct sections it will be appreciated that the slug could be formed in one piece with the material that the slug is formed from having varying permeability along its length. This would require only a simple slug shape to be formed.

Figure 6:
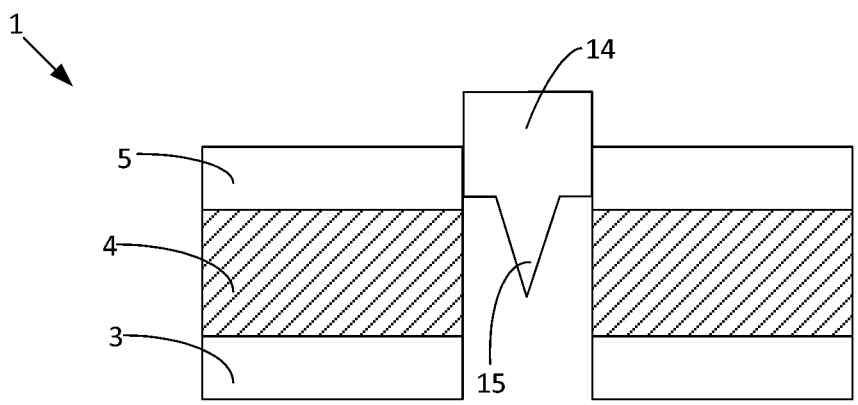
FIG. 6 shows a cross sectional view of a tuning slug having a partial conical end engaged in a bore of a core.
Figure 7:
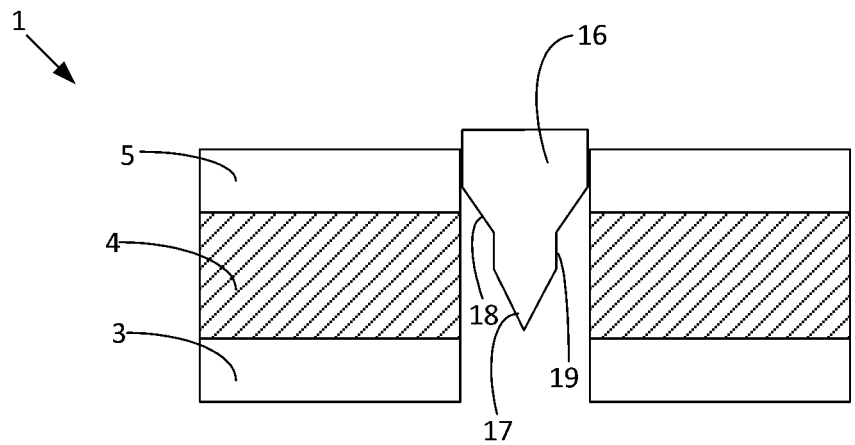
FIG. 7 shows a cross sectional view of a tuning slug having a single step conical end engaged in a bore of a core.
Figure 8:
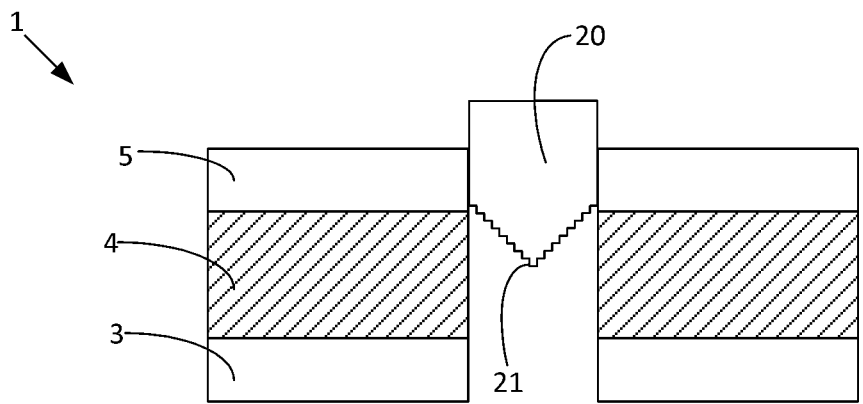
FIG. 8 shows a cross sectional view of a tuning slug having a multi-step conical end engaged in a bore of a core.
Figure 17:
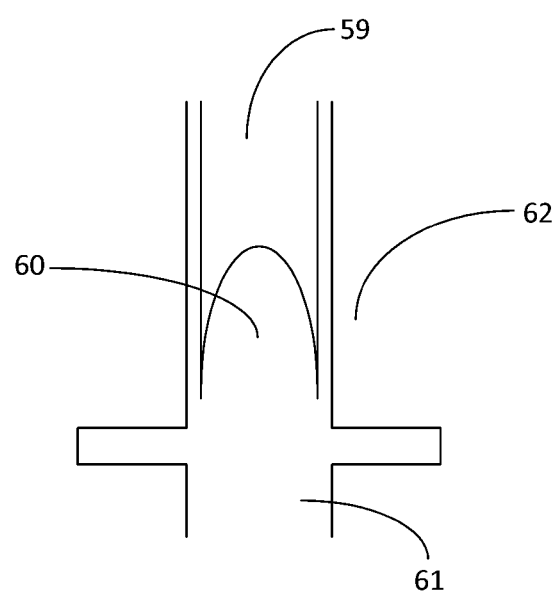
FIG. 17 shows a tuning slug having a cavity at one end engaged in the bore of a core.

FIGS. 6 to 8 show variants of the tuning slug cross-sectional shape including a slug 14 with a reduced conical tip 15 shown in FIG. 6; a slug 16 with two conical sections 17 and 18 joined by a cylindrical section 19; and a slug 20 having a stepped conical tip 21. Whilst a range of cross-sections for the distal end of the slug have been shown it will be appreciated that there are a range of possibilities that may be appropriate in different applications. FIG. 17 shows a further variant in which instead of removing material from the outside a cavity 60 may be formed in slug 59. Slug 59 is moveable within bore 61 of core 62. In this case cavity 60 is of generally elliptical form but the shape may be varied as appropriate for the application. This design may be easily formed by drilling a cavity of desired shape or moulding etc.

Figure 9:
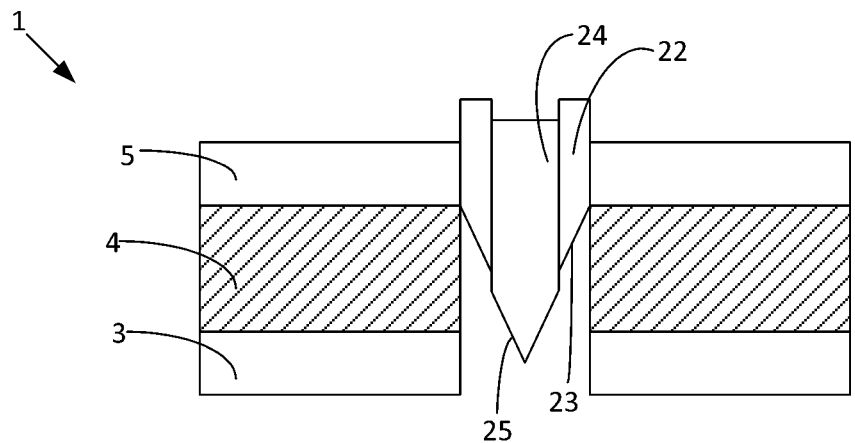
FIG. 9 shows a cross sectional view of a two part tuning slug engaged in a bore of a core.

FIG. 9 shows a variant in which the tuning slug is formed by a first slug 22 having a frusto-conical end 23 and a second slug 24 having a conical end 25. This arrangement allows slug 22 (and thus slug 24) to be moved for coarse adjustment and slug 24 to be moved relative to slug 22 for fine adjustment.

Figure 10:
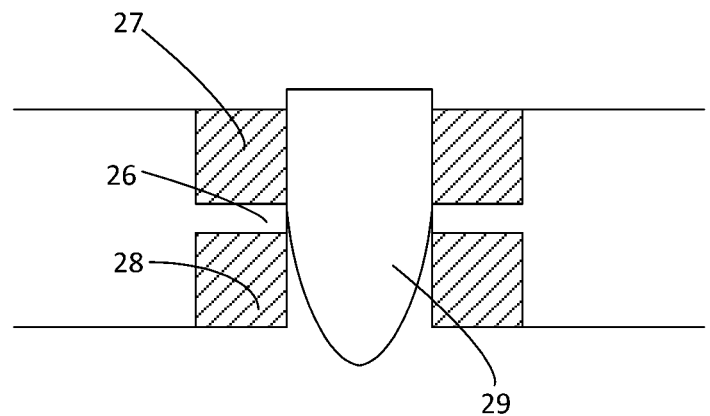
FIG. 10 shows a cross sectional view of a tuning slug having an elliptical end engaged in a bore of a core having inverted regions of permeability.

FIG. 10 shows a variant in which the core is formed of a layer of high permeability material 26 surrounded by layers 27 and 28 of lower permeability material. Slug 29 is moved axially to tune as in the previous embodiment. This embodiment also shows a tuning slug having a more rounded or hemispherical head compared with the angled pointed heads or tips of some previous embodiments.

Figure 11:
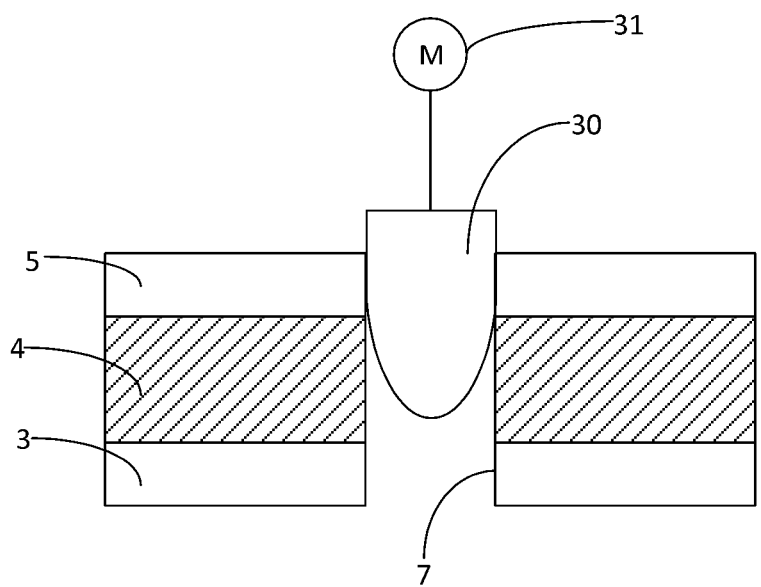
FIG. 11 shows a cross sectional view of a tuning slug advanced and retracted into a bore of a core by an actuator.

FIG. 11 shows a modification of the embodiment of FIG. 4 in which an actuator 31 advances and retracts slug 30 within bore 7. The actuator 31 may be a linear actuator, piezo actuator etc. Actuator 31 may be controlled by a control circuit which monitors the frequency of operation of an IPT circuit to actively tune the inductor or to effect power flow control.

Figure 12:
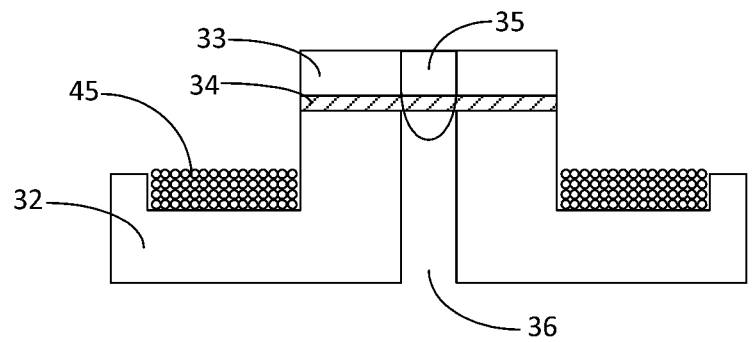
FIG. 12 shows a coil arrangement in which the core has a gap formed by a layer of low permeability.

Referring now to FIG. 12 a coil arrangement according to one embodiment is shown including a main core section 32 and a secondary core section 33 formed of a high permeability material, such as ferrite, separated by a spacer 34 formed of a low permeability material. A tuning slug 35 formed of high permeability material is moveable along bore 36 to effect tuning by introducing high permeability material to bridge the flux between core sections 32 and 33. A coil 45 is provided about the core 32.

Figure 13:
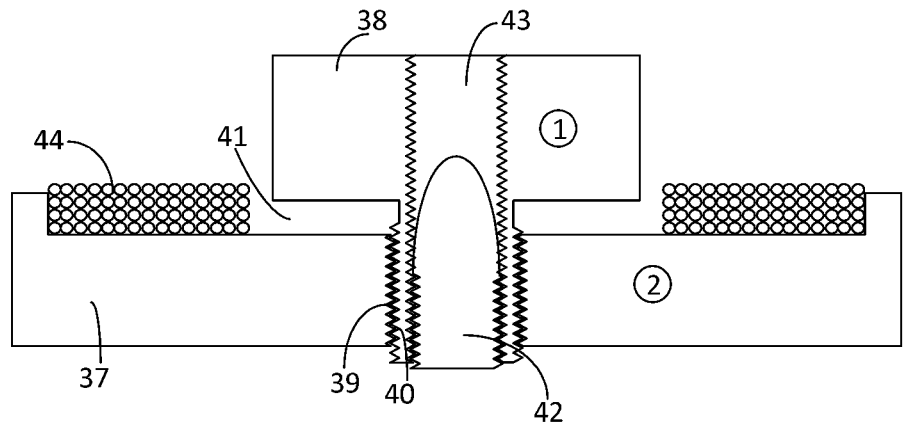
FIG. 13 shows a coil arrangement in which the core is formed in two parts with a gap that is adjustable by relative movement of the two parts.

Referring now to FIG. 13 a coil arrangement according to another embodiment is shown including a main core section 37 and a secondary core section 38 formed of a high permeability material, such as ferrite. A coil 44 is wound about, but spaced away from, core 38. The core sections 37 and 38 have complementary threads 39 and 40 allowing the air gap 41 to be adjusted to a desired spacing. A tuning slug 42 formed of high permeability material is moveable along bore 43 to effect tuning by introducing high permeability material to bridge the flux between core sections 37 and 38. This arrangement allows tuning by variation of the air gap spacing and the position of the tuning slug 42.

Figure 14:
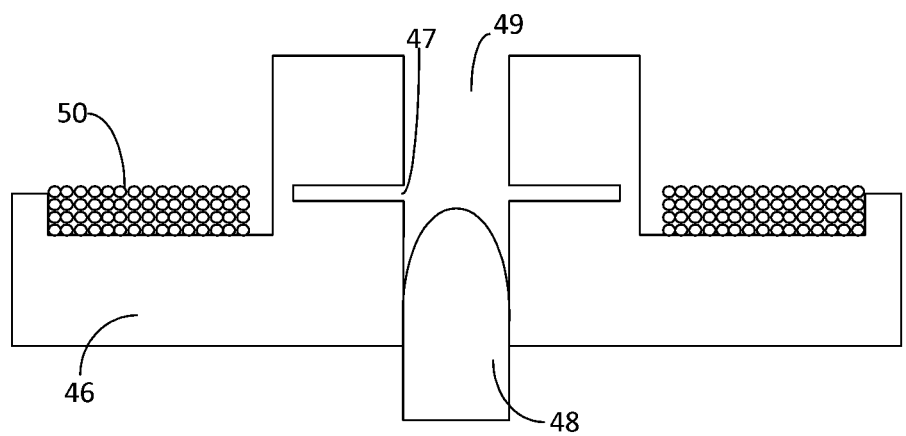
FIG. 14 shows a coil arrangement in which the core has an internal gap adjacent its bore.

Referring now to FIG. 14 a coil arrangement according to another embodiment is shown including a core section 46 formed of a high permeability material, such as ferrite. A coil 50 is wound about core 46. An air gap 47 is provided in core 46—in this case it is internal but it may also be external to bore 49. A tuning slug 48 formed of high permeability material is moveable along bore 49 to effect tuning by introducing high permeability material to bridge the flux between core sections adjacent the air gap 47.

Figure 15:
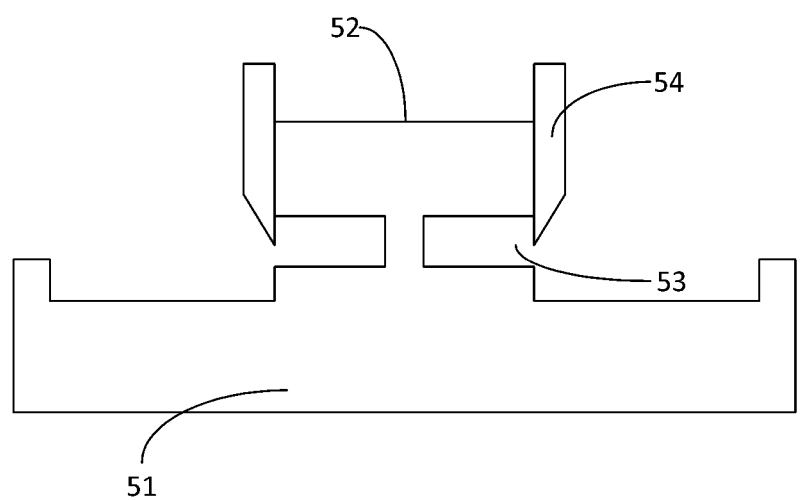
FIG. 15 shows a coil arrangement in which the core has an external gap a gap and the tuning slug is in the form of a ring moveable along the core adjacent the gap.

Referring now to FIG. 15 the core consists of a lower core section 51 joined to an upper core section 52, all formed of a high permeability material. An air gap 53 is defined between core sections 51 and 52. In this case an external slug 54 formed of a high permeability material is provided about core section 52 and may be raised and lowered with respect thereto to facilitate tuning. Various other arrangements in which the tuning slug is located and moveable about an air gap at an edge of a core are also contemplated. Such arrangements do not require the slug to move within a bore of the core.

Figure 16:
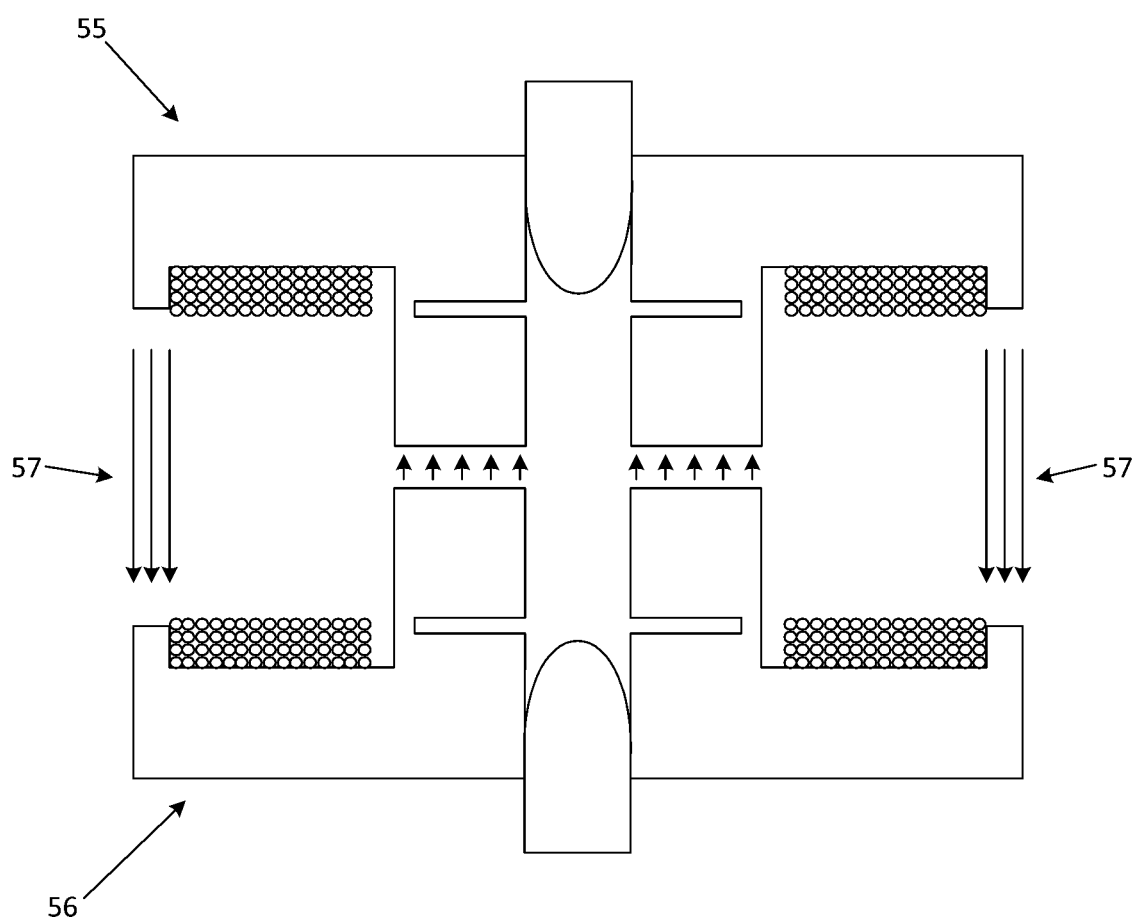
FIG. 16 shows a transmitter and receiver coil pair.

FIG. 16 shows an IPT transmitter coil 56 and an IPT receiver coil 55 of the type shown in FIG. 14 in which the cores form a magnetic path indicated by flux lines 57 in one direction passing between outer edges of the cores and flux lines 58 in the other direction passing between central regions of the cores. The direction of the flux will oscillate rapidly during power transfer. It will be appreciated that adjustment of the position of a tuning slug alters the inductance of a coil and the reluctance of the main magnetic circuit between the coils.

It will be appreciated that in all the above embodiments a coil will be provided about the core, complementary threads provided in the slug and core may be used for adjustment or the slug may be freely moveable and then secured in place by gluing etc. The aspect ratio of the tip of the tuning slug should also be greater than 1:1 to assist in fine tuning.

It will also be appreciated that the tuning slug has an "effective permeability" that varies along its length—that is to say for a cylindrical bore for example that the effective permeability at a cross-section along the axis of the bore the effective permeability is permeability for the entire cross section. Thus for a cross section where half the volume of the bore is occupied by a slug formed of a material of constant permeability the effective permeability will be half that where the entire slug occupies the bore. Alternatively, the effective permeability may vary if the slug is of constant cross-section (e.g. a cylinder) but the permeability of the material forming the slug varies progressively along the axis of the slug.

There is thus provided coil arrangements enabling precise fine tuning of inductance without the need for fine threads. Embodiments avoid the large fluctuations of inductance that are characteristic of the use of known tuning slug configurations in which the sudden introduction of a high permeability material into the flux path way affects the inductance in a non-linear or "binary" manner, making fine tuning difficult.

Where reference is made to any integer it will be appreciated that such integer may be a discrete integer or a number of integers performing the required function. Likewise, where reference is made to a number of discrete integers it will be appreciated that they may be integrated into a single unified integer. While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the applicant's general inventive concept.

The invention claimed is:

1. A wireless power transfer coil arrangement comprising:
   a core having a region of decreased magnetic permeability;
   a coil associated with the core; and
   a tuning slug, wherein the tuning slug is moveable along a range of movement that passes through the region of decreased magnetic permeability and wherein movement of the tuning slug along the range changes an inductance of the wireless power transfer coil arrangement.

2. The wireless power transfer coil arrangement of as claimed in claim 1 wherein the movement of the tuning slug along the range changes an overall magnetic permeability of the core and the tuning slug.

3. The wireless power transfer coil arrangement of as claimed in claim 2 wherein the tuning slug has a varying cross sectional area along an axis defined by the range of movement.

4. The wireless power transfer coil arrangement of as claimed in claim 3 wherein magnetic permeability of the tuning slug increases along the axis.

5. The wireless power transfer coil arrangement of as claimed in claim 3 further comprising a slot in the core, wherein the slot provides the region of decreased magnetic permeability.

6. The wireless power transfer coil arrangement of as claimed in claim 3 wherein the core is formed of materials with a first magnetic permeability and a second magnetic permeability, wherein the region of decreased magnetic permeability comprises materials with the second magnetic permeability, and wherein the first magnetic permeability is greater than the second magnetic permeability.

7. The wireless power transfer coil arrangement of as claimed in claim 3 wherein the tuning slug comprises an angled face.

8. The wireless power transfer coil arrangement of as claimed in claim 3 wherein the tuning slug comprises a conical portion.

9. The wireless power transfer coil arrangement of as claimed in claim 3 in which wherein the tuning slug has an aspect ratio greater than 1:1.

10. The wireless power transfer coil arrangement of as claimed in claim 2 wherein the tuning slug is cylindrical.

11. The wireless power transfer coil arrangement of as claimed in claim 2 wherein the tuning slung comprises a cavity.

12. The wireless power transfer coil arrangement of as claimed in claim 2 wherein which the tuning slug is threaded and engages with a complementary thread in the core.

13. The wireless power transfer coil arrangement of as claimed in claim 2 wherein the core comprises at least two core parts having adjustable spacing to adjust a size of an air gap between the at least two core parts.

14. The wireless power transfer coil arrangement of as claimed in claim 13 wherein the two core parts are connected by complementary threads.

15. The wireless power transfer coil arrangement of claim 2 wherein the tuning slug comprises at least a first section and a second section and wherein the first section is movable relative to a second section.

16. The wireless power transfer coil arrangement of claim 1 wherein the core includes a bore defining the range of movement and wherein the tuning slug is moveable through the bore.

17. The wireless power transfer coil arrangement of claim 1 wherein the core comprises an air gap which provides the region of decreased magnetic permeability and the tuning slug passes through the air gap along the range of movement.

18. The wireless power transfer coil arrangement of claim 17 wherein the core comprises a cylindrical section having a circumferential slot defining the air gap and the tuning slug is ring-shaped and moveable along the cylindrical section past the air gap.

19. The wireless power transfer coil arrangement of claim 1 further comprising an actuator that moves the tuning slug relative to the core.

20. The wireless power transfer coil arrangement of claim 19 wherein the actuator is controlled with a control circuit to maintain a frequency of operation of a current flowing in the coil within a frequency range.

21. A wireless power transfer system including the wireless power transfer coil arrangement of claim 1.

* * * * *